(12) United States Patent
Chiang (10) Patent No.: US 6,283,002 B1
(45) Date of Patent: Sep. 4, 2001

(54) TABLE SAW APPARATUS

(76) Inventor: Pei-Lieh Chiang, No. 12, Nan-Ping Rd., Nan Dist., Taichung City (TW)

( * ) Notice: Subject to any disclaimer, the term of this patent is extended or adjusted under 35 U.S.C. 154(b) by 0 days.

(21) Appl. No.: 09/493,076

(22) Filed: Jan. 28, 2000

(51) Int. Cl.⁷ ................................................ B23D 19/00
(52) U.S. Cl. ......................................... 83/477.1; 83/477.2
(58) Field of Search ................................ 83/477.1, 477.2, 83/603, 508.2, 473

(56) References Cited

U.S. PATENT DOCUMENTS

| | | | |
|---|---|---|---|
| 1,783,041 | * | 11/1930 | Hirst .................................... 83/477.1 |
| 2,008,673 | * | 7/1935 | Ocenasek ............................ 83/477.2 |
| 2,844,173 | * | 7/1958 | Gaskell ................................ 83/477.1 |
| 3,011,529 | * | 12/1961 | Copp .................................... 83/477.1 |
| 4,184,394 | * | 1/1980 | Gjerde .................................. 83/477.1 |
| 4,599,927 | * | 7/1986 | Eccardt et al. ...................... 83/477.1 |
| 5,875,698 | * | 3/1999 | Ceroll et al. ........................ 83/477.1 |
| 5,943,932 | * | 8/1999 | Sberveglieri ........................ 83/477.1 |
| 6,076,445 | * | 6/2000 | Kenyon et al. ..................... 83/477.2 |

FOREIGN PATENT DOCUMENTS

| | | | |
|---|---|---|---|
| 1220872 | * | 1/1960 | (FR) ................................... 83/477.1 |
| 506022 | * | of 1953 | (IT) ..................................... 83/477.1 |

* cited by examiner

*Primary Examiner*—Rinaldi I. Rada
*Assistant Examiner*—Omar Flores Sánchez
(74) *Attorney, Agent, or Firm*—Baker Botts L.L.P.

(57) ABSTRACT

A table saw apparatus includes a table, a saw blade, a motor, a belt-pulley mechanism, a bracket mounted pivotally on the table and connected to the motor, a saw frame mounted pivotally on the table and including a tubular seat which is connected to the saw blade and which is movable downward when the saw frame turns forward and which is movable upward when the saw frame turns rearward, a connecting unit interconnecting the tubular seat and the motor, and a height adjustment unit mounted on the table and including a first rotary drive member connected drivingly to the saw frame so as to move the saw frame forward or rearward.

10 Claims, 8 Drawing Sheets

TABLE SAW APPARATUS

BACKGROUND OF THE INVENTION

1. Field of the Invention

This invention relates to a table saw apparatus, more particularly to a table saw apparatus having a saw blade which is movable upward and downward and which is inclinable.

2. Description of the Related Art

Figure 1:
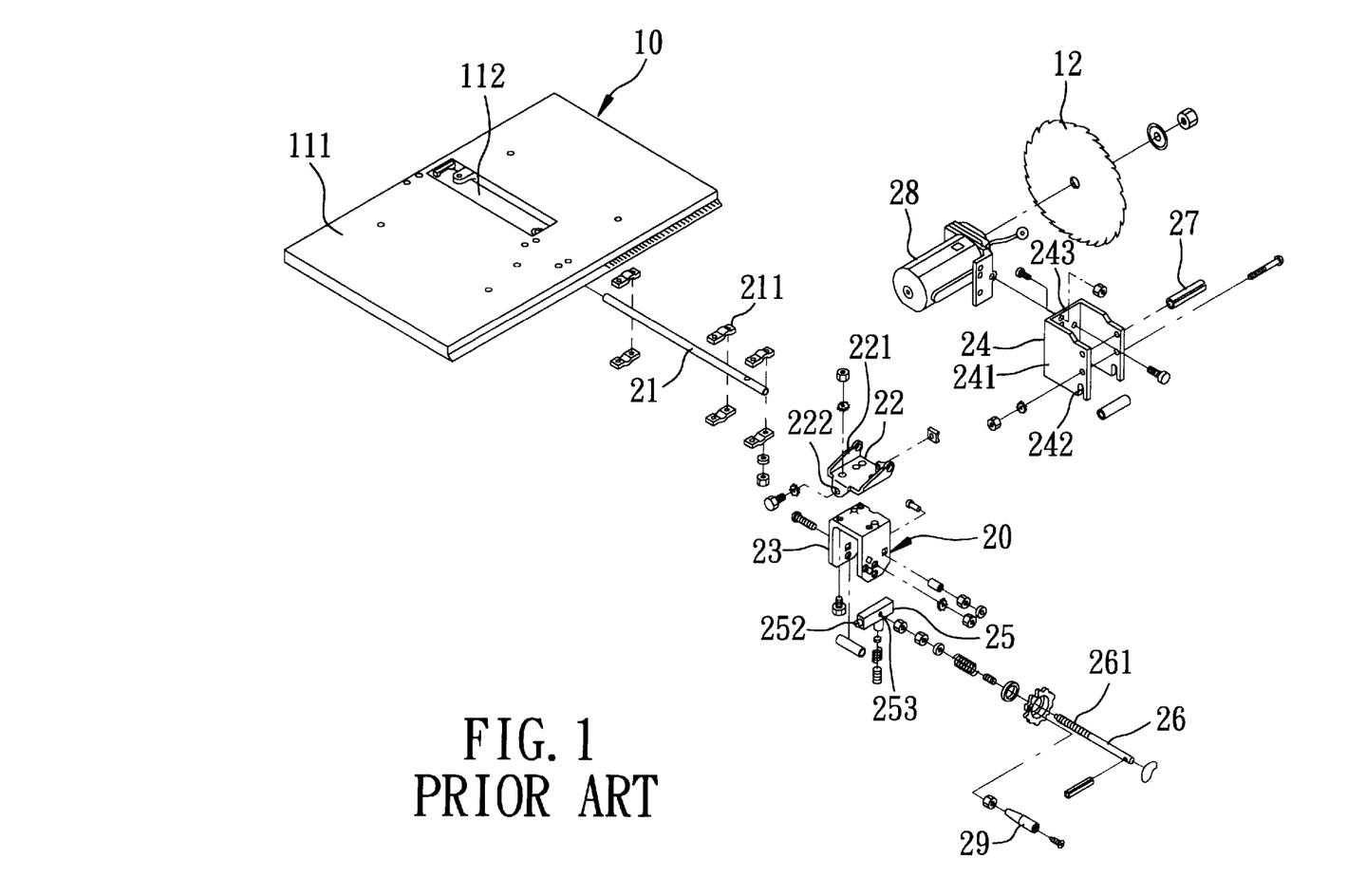
FIG. 1 is an exploded view of a conventional table saw apparatus.
Figure 2:
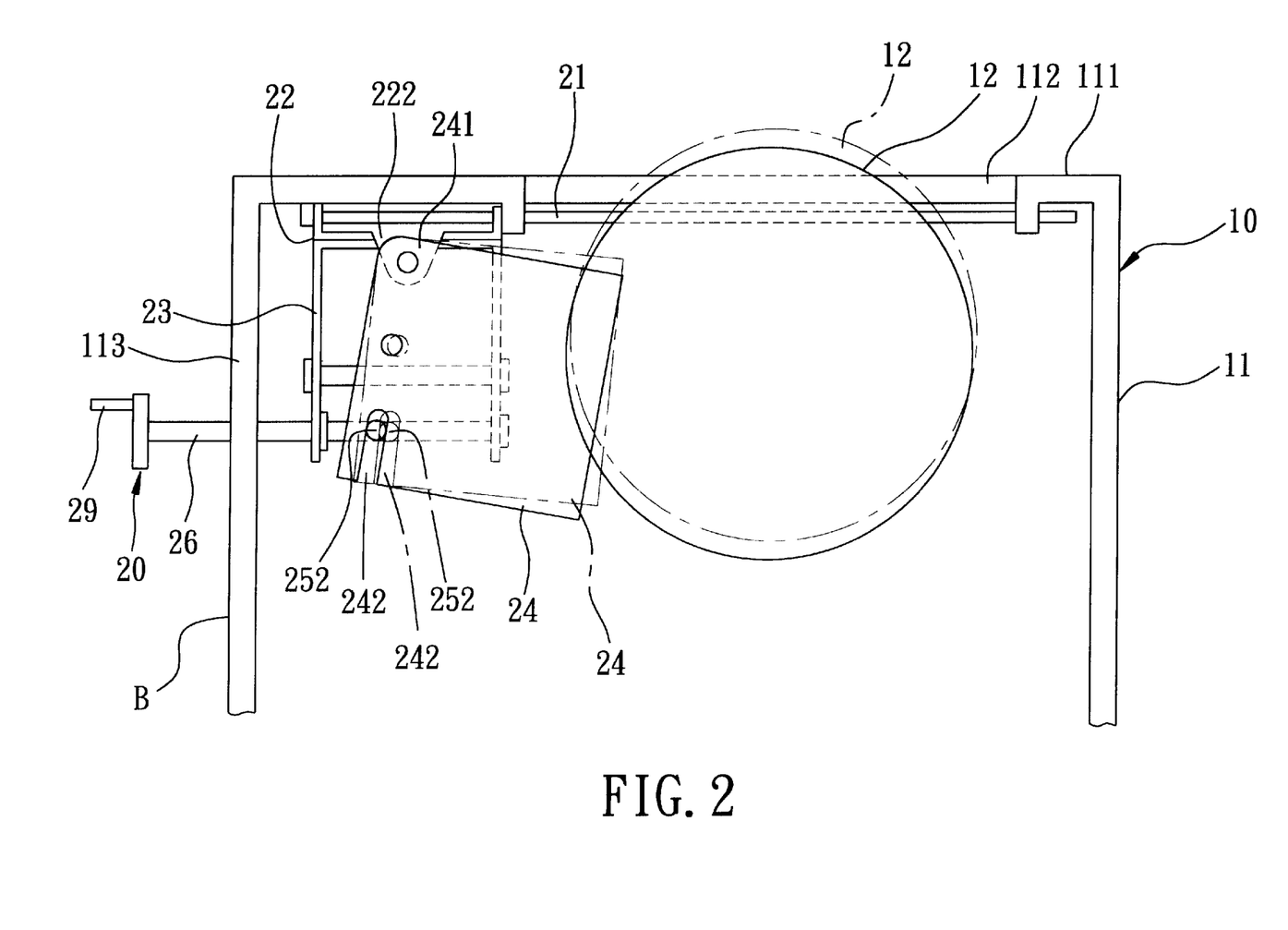
FIG. 2 is a schematic side view of the table saw apparatus of FIG. 1.
Figure 3:
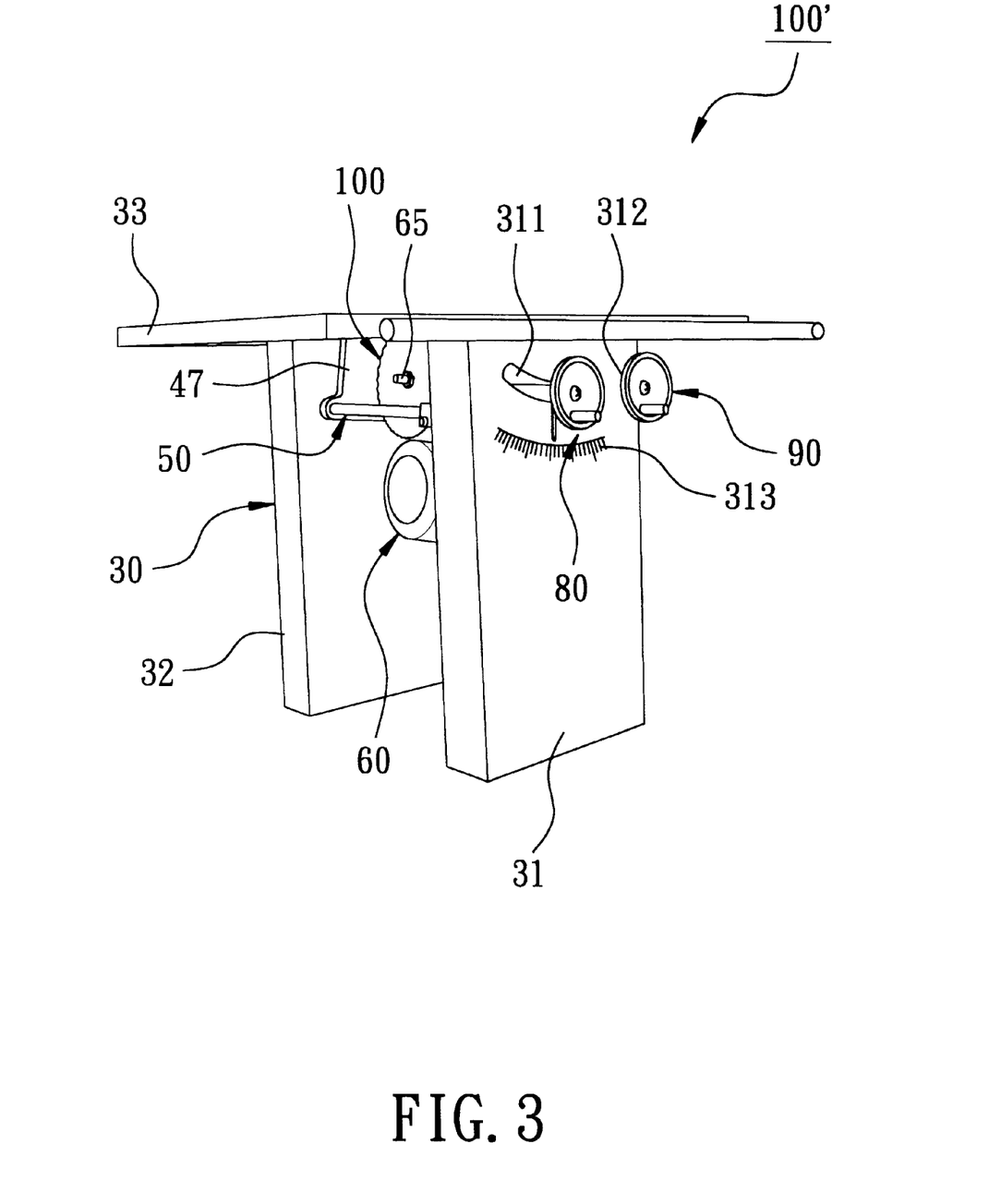
FIG. 3 is a perspective view of a table saw apparatus embodying this invention.

FIGS. 1 and 2 illustrate a conventional table saw apparatus 10 for wood sawing. The table saw apparatus 10 includes a top plate 111 having a slot 112 for receiving movably therein a saw blade 12, opposite front and rear walls 11, 13 extending downwardly from the top plate 111, a motor 28 disposed underneath the top plate 111 and having a shaft connected to the saw blade 12, and a height adjusting unit 20 disposed underneath the top plate 111 and connected to the saw blade 12 for moving the saw blade 12 upward and downward.

The height adjusting unit 20 includes an elongated support rod 21 secured to a bottom side of the top plate 111 via locking means 211, a connecting seat 22 which has two opposite upper lugs 221 sleeved on the support rod 21 and two opposite lower lugs 222 opposite to the upper lugs 221, a positioning seat 23 secured to a bottom side of the connecting seat 22, a motor seat 24 which has a base plate 243 connected securely to the motor 28 and two opposite side plates 241 projecting from two opposite sides of the base plate 241 and mounted pivotally on the lower lugs 222 via a pivot pin 27 passing through top ends of the side plates 241, a driving suspension block 25 which has two opposite thickness-reduced ends 252 inserted respectively into two opposite slots 242 that are formed respectively in bottom sides of the opposite side plates 241 of the motor seat 24, and a rotary drive member 26 which has a threaded section 261 engaging threadedly an inner thread 253 of the driving suspension block 25 and a handle 29 opposite to the threaded section 261.

When in operation, the motor seat 24 is turned upward and rearward toward the rear wall 11 to lift the saw blade 12 to pass through the slot 112 via the driving suspension block 25 which is moved in a direction from the front wall 13 toward the rear wall 11 by rotating the rotary drive member 26. The saw blade 12 can be tilted at an angle relative to the top plate 111 via the connecting seat 22, the positioning seat 23, and the motor seat 24 which are turned about the support rod 21 by moving sidewise the rotary drive member 26.

The above described table saw apparatus 10 has disadvantages in that the motor 28 is suspended from the top plate 111 via the motor seat 24 and the connecting seat 22 which is mounted pivotally on the support rod 21. As a result, such suspension is insecure, and can cause significant vibration on the table saw apparatus 10 when in use. Moreover, it is burdensome to tilt the saw blade 12 by pushing the rotary drive member 26 to turn the connecting seat 22, the motor seat 24, the driving suspension block 25, and the motor 28 about the support rod 21.

SUMMARY OF THE INVENTION

Therefore, it is an object of the present invention to provide a table saw apparatus that is capable of overcoming the aforementioned problems.

Accordingly, a table saw apparatus of this invention comprises: a table having left and right sides, front and rear walls, and a top plate on top of the front and rear walls, the top plate having a slot extending in a direction from the front wall toward the rear wall; a movable saw blade disposed movably underneath the top plate and extendable into the slot, the saw blade having a first shaft which extends sidewise therefrom relative to the table; a motor disposed underneath the top plate and having a second shaft which extends sidewise therefrom relative to the table; a belt-pulley mechanism interconnecting the first and second shafts for synchronizing rotations of the first and second shafts; a bracket mounted pivotally on the table between the front and rear walls so as to be turnable downward and forward, and upward and rearward, the bracket holding rigidly the motor; a saw frame mounted pivotally on the table between the front and rear walls for turning forward or rearward, the saw frame being disposed above the motor and including a tubular seat which is movable downward when the saw frame turns forward and which is movable upward when the saw frame turns rearward, the tubular seat holding rotatably the first shaft thereinside; a connecting unit interconnecting the tubular seat and the motor so that the motor is moved along with the tubular seat; and a height adjustment unit mounted on one of the front and rear walls and including a first rotary drive member extending in a direction parallel to a line extending from the front wall to the rear wall, the first rotary drive member being connected drivingly to the saw frame so as to move the saw frame forward or rearward.

BRIEF DESCRIPTION OF THE DRAWINGS

In drawings which illustrate an embodiment of the invention.

DETAILED DESCRIPTION OF THE PREFERRED EMBODIMENT

FIGS. 3 to 6 illustrate a table saw apparatus 100' embodying this invention. The table saw apparatus 100' includes a table 30, opposite front and rear suspension plates 40, 47, two opposite support rods 50, a transmission unit 60, a saw frame 70, a saw blade 100 having a first shaft 65 extending outwardly therefrom, a height adjustment unit 80, and an inclination adjustment unit 90.

The table 30 has opposite left and right sides, opposite front and rear walls 31, 32, and a top plate 33 on top of the front and rear walls 31, 32. A slot 331 is formed in the top plate 33, and extends in a direction from the front wall 31 toward the rear wall 32 for receiving the saw blade 100. Spaced apart first and second arc-shaped openings 311, 312 are formed in the front wall 31. A scale 313 is provided on the front wall 31 underneath the first arc-shaped opening 311 for height adjustment of the saw blade 100. Opposite front and rear locking seats 34, 35 are mounted sidewise relative to the table 30 and securely on a bottom side of the top plate 33, and are disposed respectively adjacent to the front and rear walls 31, 32. The front and rear locking seats 34, 35 respectively have front and rear curved rails 341, 351 extending sidewise relative to the table 30. Each of the front and rear curved rails 341, 351 is convex in a direction downwardly of the top plate 33.

Figure 4:
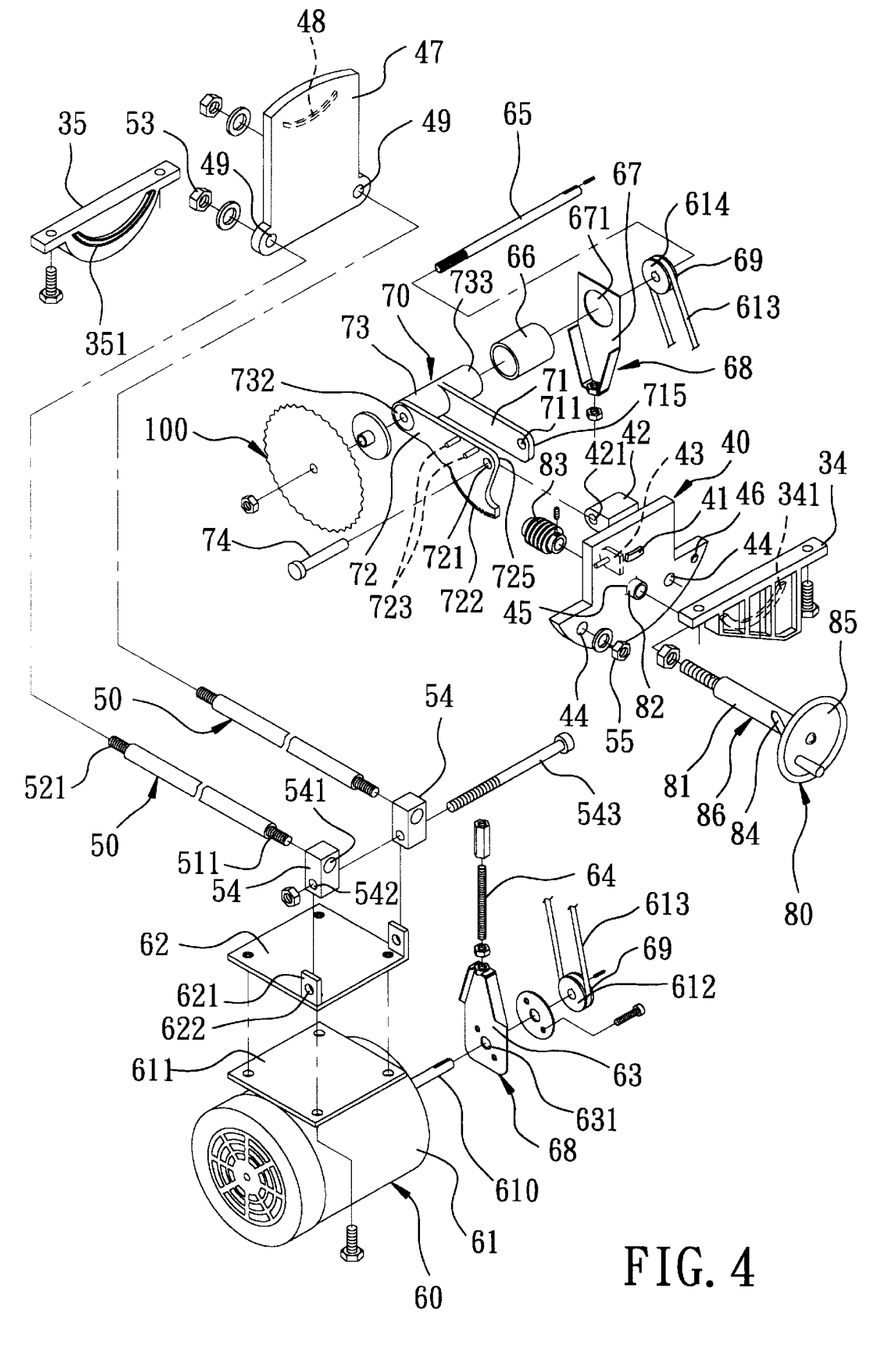
FIG. 4 is an exploded perspective view of the table saw apparatus of FIG. 3.
Figure 5:
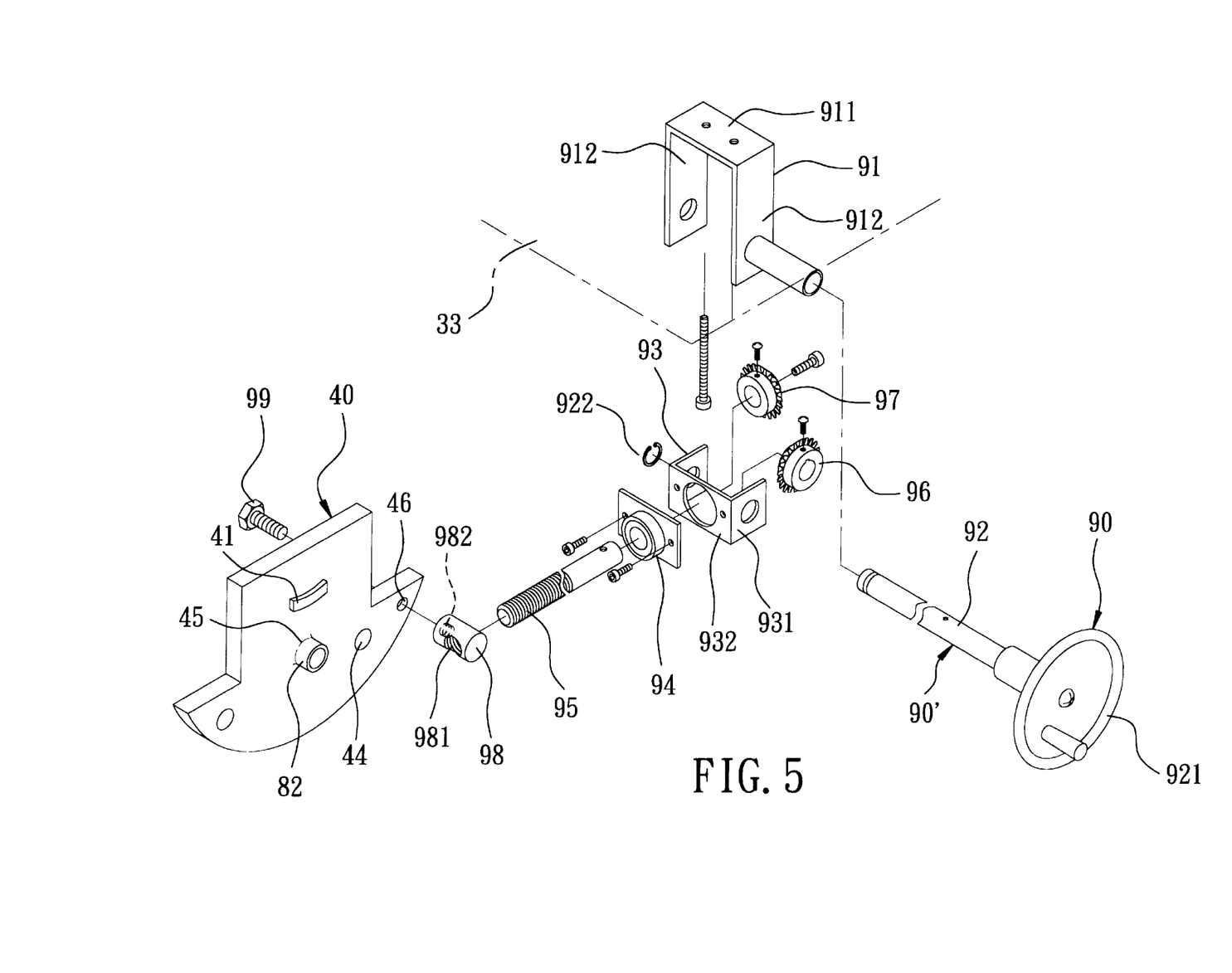
FIG. 5 is a fragmentary exploded view of the table saw apparatus of FIG. 3.
Figure 6:
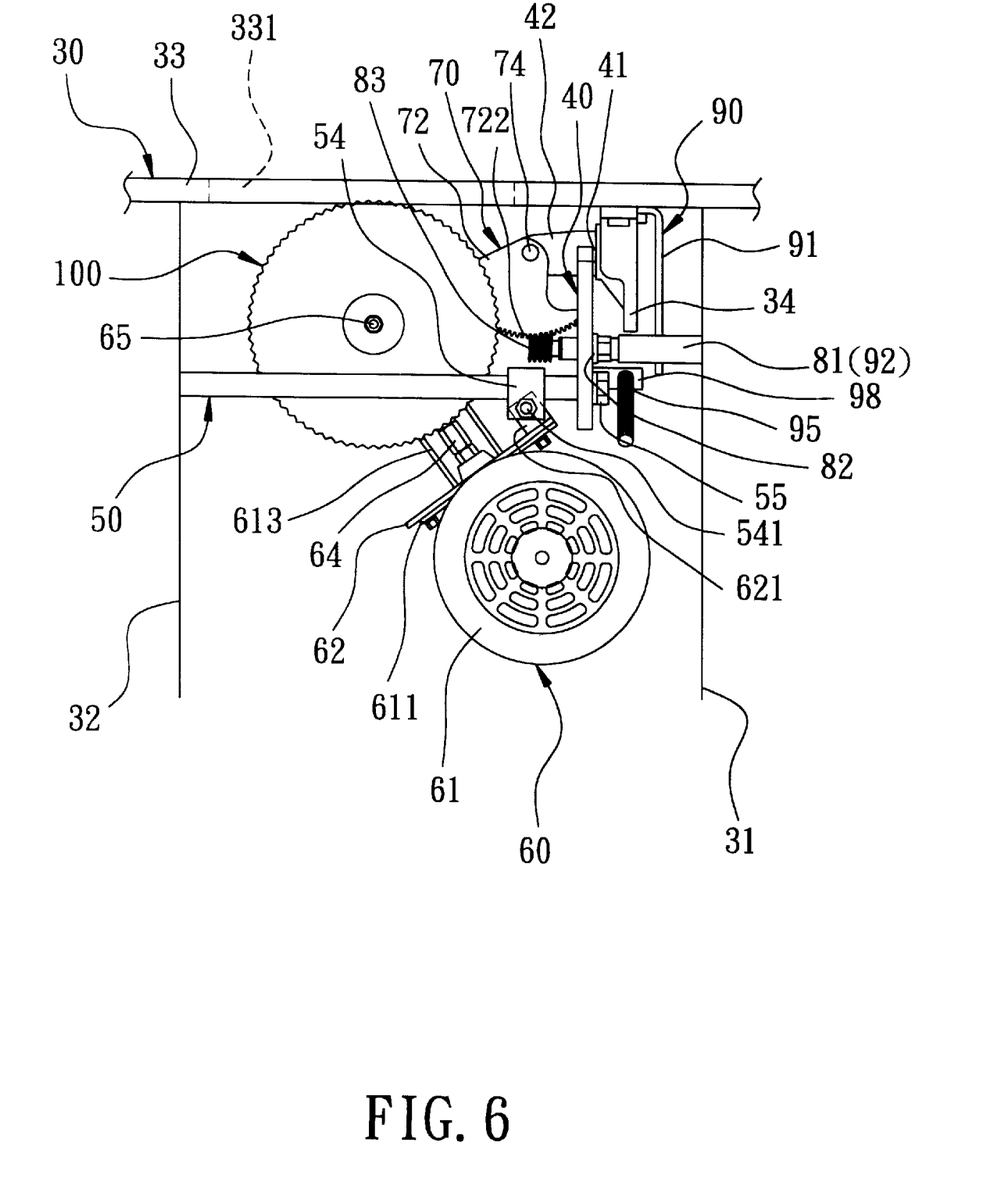
FIG. 6 is a schematic side view of the table saw apparatus of FIG. 3 in a position of rest.

The front suspension plate 40 is disposed substantially vertically and sidewise relative to the table 30, and has top and bottom ends, and a front slide protrusion 41 which is disposed below the top end of the front suspension plate 40 and which projects into the front curved rail 341. The rear suspension plate 47 is disposed substantially vertically and sidewise relative to the table 30, and has top and bottom ends, and a rear slide protrusion 48 which is disposed below the top end of the rear suspension plate 47 and which projects into the rear curved rail 341. The bottom end of the front suspension plate 40 has two opposite through-holes 44 at two opposite sides. The bottom end of the rear suspension plate 47 has two opposite through-holes 49 at two opposite sides. A pivot protrusion 42 projects from the front suspension plate 40 below the top end of the latter toward the rear suspension plate 47, and has a through-hole 421 formed therein. A first limiting element 43 projects from the front suspension plate 40 below the pivot protrusion 42 toward the rear suspension plate 47. A central opening 45 is formed in the front suspension plate 40 below the first limiting element 43. A side opening 46 is formed in the front suspension plate 40 adjacent to one of the through-holes 44 in the front suspension plate 40.

Each of the support rods 50 has opposite threaded ends 511, 521 extending respectively through one of the through-holes 44 in the front suspension plates 40 and one of the through-holes 49 in the rear suspension plate 47 at one side of the table 30, and mounted securely and respectively on the front and rear suspension plates 40, 47 via nut means 55, 53 that engage the threaded ends 511, 521. A suspension block 54 is sleeved on each support rod 50 between the opposite threaded ends 511, 521. Each suspension block 54 has an upper pivot hole 541 for receiving the respective support rod 50, and a lower pivot hole 542 below the upper pivot hole 541.

The transmission unit 60 includes a motor 61 having a second shaft 610 which extends sidewise therefrom relative to the table 30, a bracket 62, a connecting unit 68, and a belt-pulley mechanism 69 interconnecting the first and second shafts 65, 610 for synchronizing rotations of the first and second shafts 65, 610. A base plate 611 is connected securely to a top side of the motor 61 at one side, and is connected securely to a bottom side of the bracket 62 at the other side. The bracket 62 has two opposite lugs 621 projecting upwardly therefrom and mounted pivotally on the suspension blocks 54 via a pivot pin 543 passing through the lower pivot holes 542 in the suspension blocks 54 and through-holes 622 that are formed in the opposite lugs 621 of the bracket 62 so that the bracket 62 is turnable downward and forward toward the front wall 31, and is turnable upward and rearward toward the rear wall 32. The belt-pulley mechanism 69 has upper and lower pulleys 614, 612 mounted rotatably and respectively on free ends of the first and second shafts 65, 610, and a belt 613 interconnecting the upper and lower pulleys 614, 612. The connecting unit 68 has an upper plate 67 which is disposed between the saw blade 100 and the upper pulley 614 and which is formed with an upper hole 671, and a lower plate 63 which is disposed between the motor 61 and the lower pulley 612 below the upper plate 67, which is mounted securely on the motor 61, and which is formed with a lower hole 631 for receiving the second shaft 610. A screw rod 64 interconnects threadedly and rigidly the upper and lower plates 67, 63.

The saw frame 70 has a tubular seat 73 disposed sidewise relative to the table 30 between the saw blade 100 and the upper pulley 614, and spaced apart left and right pivot arms 72, 71 which project radially and forwardly from the tubular seat 73 toward the front suspension plate 40 and which are disposed respectively adjacent to the saw blade 100 and the upper pulley 614. The left and right pivot arms 72, 71 respectively have front pivot ends 725, 715 which are formed respectively with pivot holes 721, 711 and which are mounted pivotally on the pivot protrusion 42 via a pivot member 74 passing through the pivot holes 721, 711 in the front pivot ends 725, 715 and the through-hole 421 in the pivot protrusion 42. A sleeve 66 is sleeved on the tubular seat 73 at one side of the right pivot arm 71 adjacent to the upper pulley 614, and is received fittingly in the upper hole 671 in the upper plate 67. A first bearing 732 is inserted into the tubular seat 73 for receiving journalledly the first shaft 65 therein. A pair of second limiting elements 723 project outwardly from the left pivot arm 72 for engaging movably the first limiting element 43. A sector gear 722 is formed on a bottom of the left pivot arm 72 below the pivot member 74.

Figure 7:
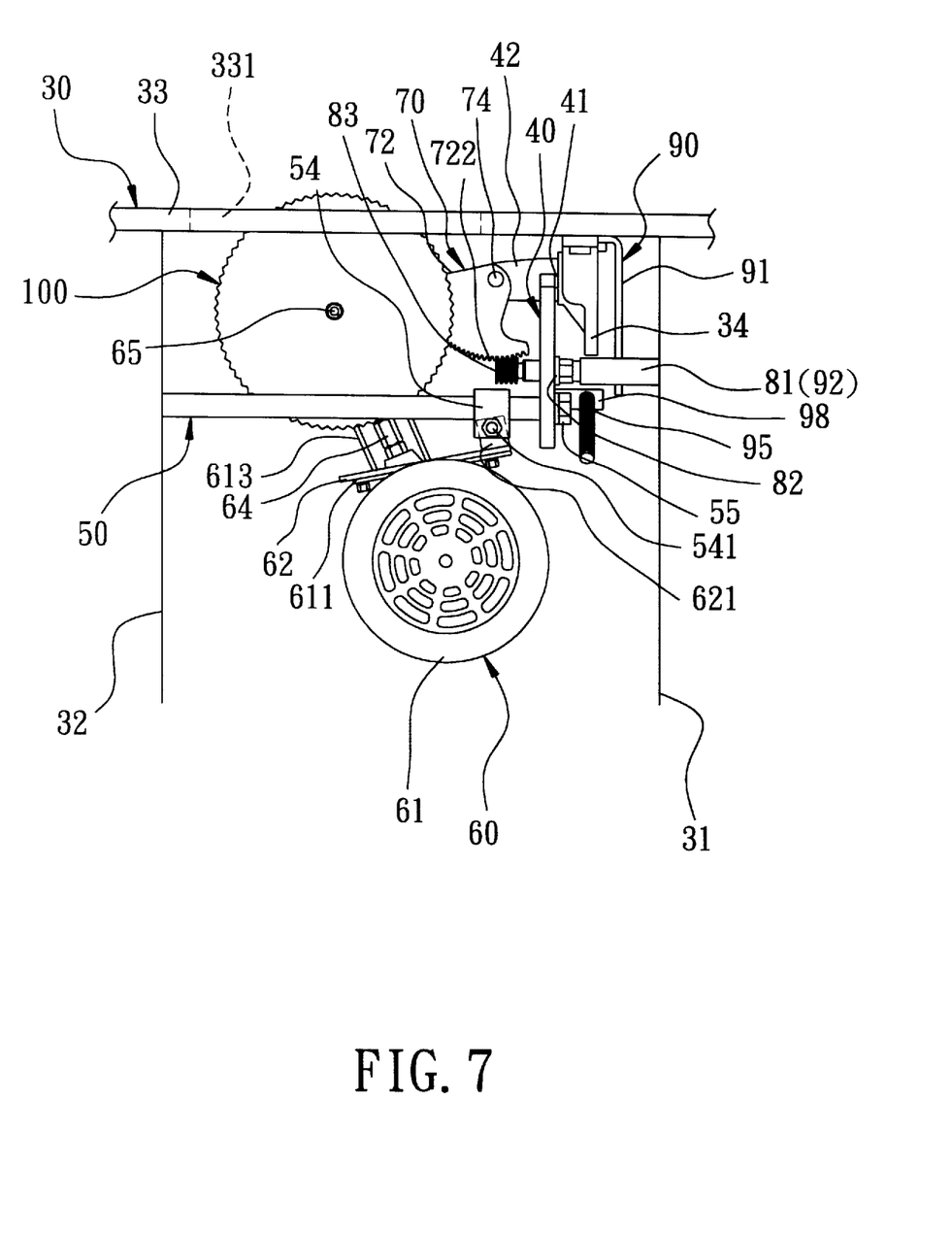
FIG. 7 is a schematic side view of the table saw apparatus of FIG. 3 in an operative position.

The height adjustment unit 80 includes a first rotary drive member 86, a bushing 82 inserted into the central opening 45 in the front suspension plate 40, and a worm 83 disposed between the front suspension plate 40 and the tubular seat 73. The first rotary drive member 86 has a first rod portion 81 with a threaded inner end that extends through the arc-shaped opening 311 in the front wall 31 and the bushing 82 in a direction parallel to a line extending from the front wall 31 to the rear wall 32 for engaging threadedly the worm 83, and an outer end that is opposite to the inner end and that is connected to a first wheel 85 at one side of the front wall 31 opposite to the worm 83. The worm 83 engages the sector gear 722 so that the tubular seat 73 is movable downward and forward along with a forward movement of the sector gear 722 on the worm 83 toward the front wall 31, and is movable upward and rearward along with a rearward movement of the sector gear 722 on the worm 83 toward the rear wall 32 when the worm 83 is rotated by rotating the first rotary drive member 86. An indicator 84 is mounted on the first rod portion 81 of the first rotary drive member 86 adjacent to the wheel 85, and points to the scale 313. When in use, the saw frame 70 turns upward and rearward toward the rear wall 31 by operating the height adjustment unit 80, thereby turning the bracket 62 upward and rearward and lifting the saw blade 100 to extend through the slot 331 as well (see FIG. 7).

Figure 8:
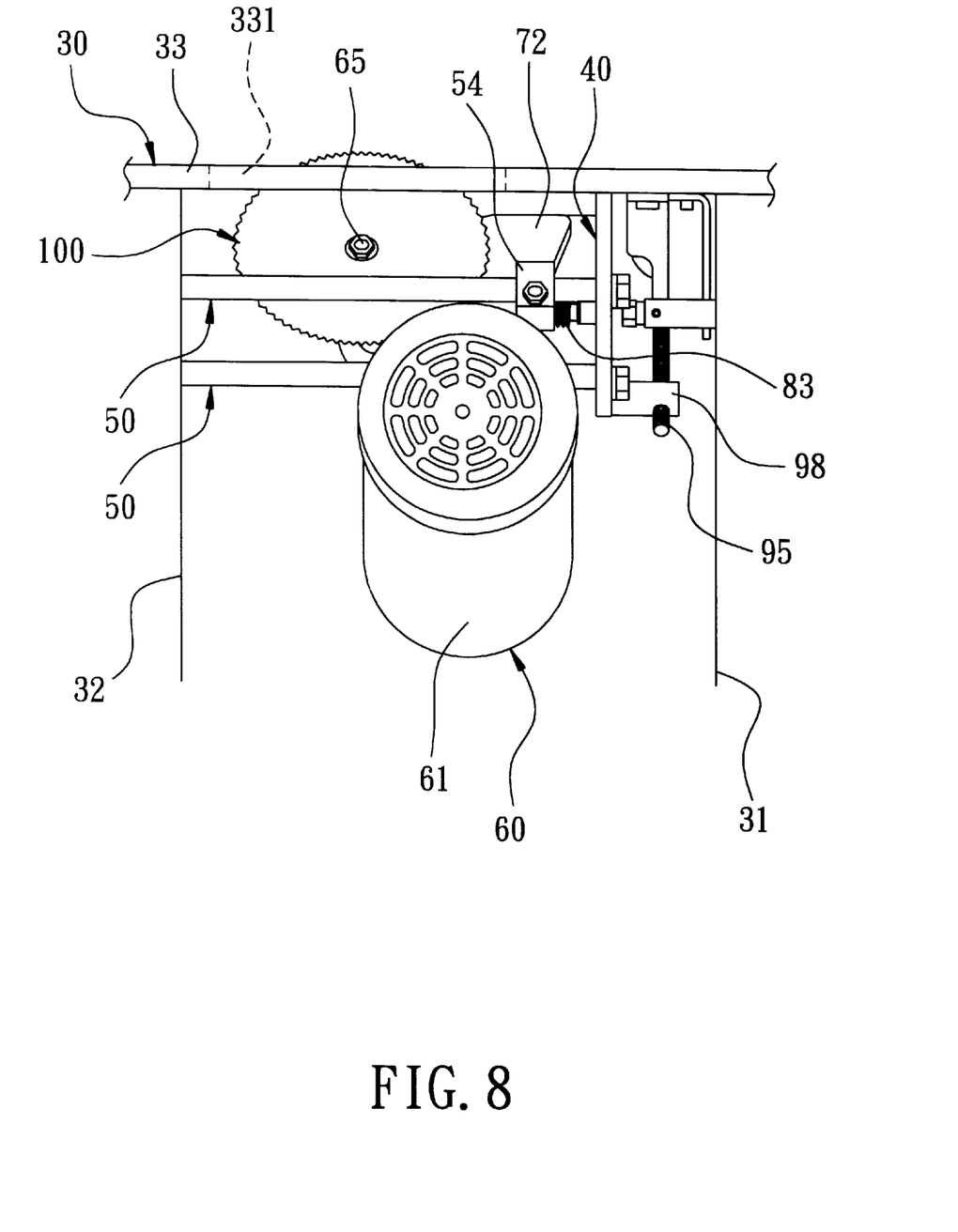
FIG. 8 is a schematic side view of the table saw apparatus of FIG. 3 in a tilted position.

The inclination adjustment unit 90 includes a stationary support frame 91 which has a first U-shaped base plate 911 mounted securely on a bottom side of the top plate 33 adjacent to the front wall 31 and two opposite first side plates 912 extending downwardly from two opposite ends of the first U-shaped base plate 911, a bearing seat 93 which is disposed between the first side plates 912 of the stationary support frame 91 and which has a second U-shaped base plate 932 and two opposite second side plates 931, a second bearing 94 received in an aperture formed in the second U-shaped base plate 932, a second rotary drive member 90' which has a second rod portion 92 that has one end extending through the front wall 31, one of the first side plates 912 of the stationary support frame 91, and one of the second side plates 931 of the bearing seat 93 and connected securely to a first bevel gear 96, a screw rod 95 which extends in a direction perpendicular to the second rod portion 92 and which has one end received rotatably in the second bearings 94 and connected securely to a second bevel gear 97 which engages the first bevel gear 96, and a female screw member 98 secured to one end of the front suspension plate 40 below the front slide protrusion 41 and engaging threadedly the other end of the screw rod 95. A second wheel 921 is connected to the other end of the rod portion 92 at one side of the front wall 31. The front and rear suspension plates 40, 47 slide respectively along the front and rear curved rails 341, 351 via the female screw member 98 and the support rods 50 when the screw rod 95 is turned by operating the second rotary drive member 90', thereby inclining the saw blade 100 at an angle relative to the top plate 33 via the saw frame 70 (see FIG. 8).

Since the motor 61 is supported by the support rods 50 via the bracket 62 and by the saw frame 70 via the connecting unit 68, the aforementioned vibration encountered during operation of the conventional table saw apparatus is significantly reduced. Moreover, the saw blade 100 of the table saw apparatus 100' of this invention can be tilted with less effort than that of the aforementioned conventional table saw apparatus by virtue of the inclination adjustment unit 90.

With the invention thus explained, it is apparent that various modifications and variations can be made without departing from the spirit of the present invention. It is therefore intended that the invention be limited only as recited in the appended claims.

I claim:
1. A table saw apparatus comprising:
   a table having left and right sides, front and rear walls, and a top plate on top of said front and rear walls, said top plate having a slot extending in a direction from said front wall toward said rear wall;
   a movable saw blade disposed movably underneath said top plate and extendable into said slot, said saw blade having a first shaft which extends sidewise therefrom relative to said table;
   a motor disposed underneath said top plate and having a second shaft which extends sidewise therefrom relative to said table;
   a belt-pulley mechanism interconnecting said first and second shafts for synchronizing rotations of said first and second shaft;
   a bracket mounted pivotally on said table between said front and rear walls for turning forward or rearward, said saw frame being disposed above said motor and including a tubular seat which is movable downward when said saw frame turns forward and which is movable upward when said saw frame turns rearward, said tubular seat holding rotatable said first shaft thereinside;
   a connecting unit interconnecting said tubular seat and said motor so that said motor is moved along with said tubular seat; and
   a height adjustment unit mounted on one of said front and rear walls and including a first rotary drive member extending in a direction parallel to a line extending from said front wall to said rear wall, said first rotary drive member being connected drivingly to said saw frame so as to move said saw frame forward or rearward,
   wherein said height adjustment unit is mounted on said front wall and further includes a worm mounted on said first rotary drive member, said saw frame further including an arm which projects radially and forwardly from said tubular seat and which has a front pivot end mounted pivotally on said table at said front wall via a pivot member and about which said saw frame is turned, and a sector gear formed on a bottom of said arm below said pivot member, said sector gear engaging said worm so that said tubular seat is turned downward along with a forward movement of said sector gear, and is turned upward along with a rearward movement of said sector gear when said worm is turned,
   wherein said connecting unit includes an upper plate formed with an upper hole, a lower plate formed with a lower hole, and a screw rod coupling rigidly said upper and lower plates, said tubular seat having a sleeve thereon, said sleeve being received fittingly in said upper hole, said second shaft being received in said lower hole, said lower plates being connected securely to said motor.

2. A table saw apparatus comprising:
   a table having left and right sides, front and rear walls, and a top plate on top of said front and rear walls, said top plate having a slot extending in a direction from said front wall toward said rear wall;
   a movable saw blade disposed movably underneath said top plate and extendable into said slot, said saw blade having a first shaft which extends sidewise therefrom relative to said table;
   a motor disposed underneath said top plate and having a second shaft which extends sidewise therefrom relative to said table;
   a belt-pulley mechanism interconnecting said first and second shafts for synchronizing rotations of said first and second shaft;
   a bracket mounted pivotally on said table between said front and rear walls for turning forward or rearward, said saw frame being disposed above said motor and including a tubular seat which is movable downward when said saw frame turns forward and which is movable upward when said saw frame turns rearward, said tubular seat holding rotatably said first shaft thereinside;
   a connecting unit interconnecting said tubular seat and said motor so that said motor is moved along with said tubular seat;
   a height adjustment unit mounted on one of said front and rear walls and including a first rotary drive member extending in a direction parallel to a line extending from said front wall to said rear wall, said first rotary drive member being connected drivingly to said saw frame so as to move said saw frame forward or rearward; and
   a substantially vertical front suspension plate mounted sidewise on said table adjacent to said front wall, a substantially vertical rear suspension plate mounted sidewise on said table adjacent to said rear wall, and a pair of support rods extending across and having opposite ends mounted on said front and rear suspension plates, said saw frame being mounted pivotally on said front suspension plate, said bracket being mounted pivotally on said support rods.

3. The table saw apparatus as claimed in claim 2, further comprising a pair of suspension blocks sleeved respectively on said support rods, said suspension blocks having pivot holes below said support rods, and a pivot pin passing through said pivot holes in said suspension blocks, said bracket being pivoted to said suspension blocks via said pivot pin, said motor having a base plate secured to said bracket.

4. The table saw apparatus as claimed in claim 3, wherein said saw frame further includes a pair of arms which project radially and forwardly from said tubular seat and which respectively have front pivot ends, said front suspension plate having a top end to which said front pivot ends are pivotally connected.

5. The table saw apparatus as claimed in claim 4, wherein said first rotary drive member passes through said front wall and said front suspension plate below said top end of said front suspension plate and between said support rods, said height adjustment unit further including a worm mounted on said first rotary drive member, one of said arms having a bottom formed with an integral sector gear, said sector gear engaging said worm so that said tubular seat is movable downward along with a forward movement of said sector gear, and is movable upward along with a rearward movement of said sector gear.

6. The table saw apparatus as claimed in claim 5, further comprising front and rear locking seats secured rigidly to said table and disposed respectively adjacent to said front and rear walls, said front and rear locking seats respectively having front and rear curved rails which extend sidewise relative to said table, said front suspension plate having a front slide protrusion disposed between said top end of said front suspension plate and said first rotary drive member above said support rods and projecting into said front curved rail, said rear suspension plate having a rear slide protrusion disposed above said support rods and projecting into said rear curved rail.

7. The table saw apparatus as claimed in claim 6, further comprising an inclination adjustment unit connected to said front suspension plate so as to move said front suspension plate sidewise relative to said table to thereby incline said saw blade at an angle relative to said top plate via said tubular seat.

8. The table saw apparatus as claimed in claim 7, wherein said inclination adjustment unit includes a stationary support frame mounted on said table beneath said top plate adjacent to said front wall, a second rotary drive member passing through said front wall and mounted rotatably on said stationary support frame, a screw rod mounted rotatably on said stationary support frame in a perpendicular position relative to said second rotary drive member, a female screw member secured to one end of said front suspension plate below said front slide protrusion of said front suspension plate and engaging threadedly said screw rod, a first bevel gear mounted on said second rotary drive member, and a second bevel gear engaging said first bevel gear and connected to said screw rod, said front and rear suspension plates being moved respectively along said front and rear curved rails via said female screw member when said screw rod is turned by said second rotary drive member, thereby inclining said saw blade at an angle relative to said top plate via said saw frame.

9. The table saw apparatus as claimed in claim 6, wherein said connecting unit includes an upper plate formed with an upper hole, a lower plate formed with a lower hole, and a screw rod coupling rigidly said upper and lower plates, said tubular seat further having a sleeve sleeved thereon, said sleeve being received fittingly in said upper hole, said second shaft being received in said lower hole, said lower plate being connected securely to said motor.

10. The table saw apparatus as claimed in claim 9, wherein said tubular seat has bearings provided thereinside, said first shaft being journalled in said bearings and having one end passing through said sleeve and connected to said belt-pulley mechanism, said first shaft further having an opposite end connected to said saw blade outwardly of said tubular seat.

* * * * *